Dec. 12, 1967 G. COANDA ET AL 3,357,674

TUBING CLAMP

Filed July 1, 1963

INVENTORS
GEORGE COANDA
ROGER A. EKBOM
BY
Robert T. Merrick

# United States Patent Office 3,357,674
Patented Dec. 12, 1967

3,357,674
TUBING CLAMP
George Coanda, North Hollywood, and Roger A. Ekbom, La Crescenta, Calif., assignors to Pharmaseal Laboratories, Glendale, Calif., a corporation of California
Filed July 1, 1963, Ser. No. 291,996
3 Claims. (Cl. 251—7)

ABSTRACT OF THE DISCLOSURE

A flexible tubing clamp including an elongated flat body with a longitudinal slot, which slot has a wide end and a narrow end. A thumb ring is integrally connected to the body near the slot's narrow end, the clamp having its slot closed between the narrow end and the thumb ring. Fluid flow through the tubing is shut off by sliding the tubing transversely into the narrow end of the slot, and resumed by sliding the tubing into the wide end. The thumb ring provides a convenient means of accomplishing these manipulations with one hand.

Figure 1:
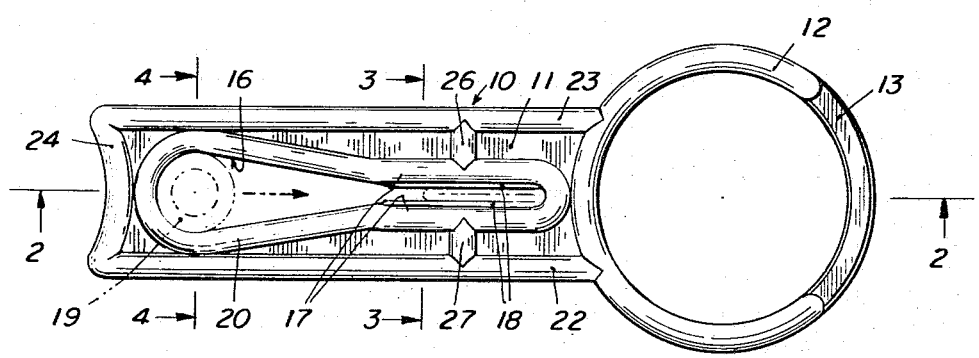

This invention relates to a tubing clamp and more particularly to a sliding clamp that can be easily used to turn on or off the flow of fluid through a flexible tubing. This particular clamp is very useful in stopping and starting the flow of fluid in a flexible tubing used in connection with fountain syringes, enema administration units, and intravenous solution containers.

There have been many problems in the field of inexpensive clamps for large stiff tubing. This type of tubing is used where a large volume of fluid flow is required such as in enemas, fountain irrigation, and such. Many times it is necessary to turn the flow of fluid through this tubing on and off. Particularly as concerns disposable items using large stiff tubing, the use of large elaborate metal clamps is prohibited because of costs. Crimping-type clamps that employ a sort of metal sheath around the tubing that is easily bent to cause crimping of the tubing and thus shut off the flow of fluid through the tube, have the disadvantage of breaking when the metal sheath is bent back and forth too many times.

Various types of slide clamps have been proposed. When these clamps are made of thin metal then tend to cut into the operator's hand and are uncomfortable to use. Thick metal is seldom used because of cost. Plastic slide clamps tend to twist or distort too easily to be used on heavy plastic tubing. Moreover, these clamps are difficult to use because they flop loosely or spin around the plastic tube, especially when they are in the unclamped position. Thus, two hands are normally required for proper operation of the clamp, and this is frequently inconvenient.

The present invention solves many of these problems by providing a simple slide clamp that can be easily molded from a plastic material and has a long useful life. The number of times that this clamp can be used to turn on and off the flow of fluid in a stiff large tube far exceeds the number of times it would actually be used in the field particularly if it were installed on a disposable item. As there are no moving parts which plague many of the metal-type clamps, there is little if anything that can prevent the clamp of the present invention from working properly. One of the disadvantages of slide-type clamps is that the narrow tube-collapsing portion may tend to spread and not completely close off the tubing. In the present invention, there is no such spreading of the narrow tube-collapsing portion because of the ribbing around the rectangular-shaped body and the enclosed slot. The lateral ribbing near the narrow portion of the slot prevents the slot from spreading.

It is therefore an object of this invention to provide an inexpensive, improved tubing clamp which can conveniently be molded of plastic material.

Another object of this invention is to provide a one-piece plastic tubing clamp which will not twist or distort when used on stiff plastic tubing.

A further object of the invention is to provide a tubing clamp which includes an improved means for holding, orienting, and using the clamp, so that it can conveniently be used with one hand through the use of a thumb ring.

Figure 2:
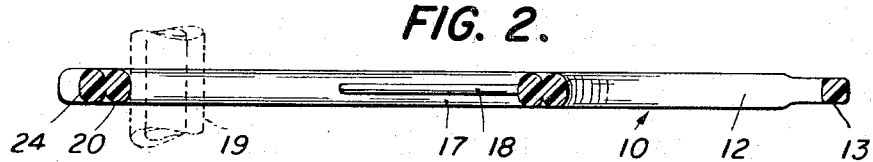
Figure 3:
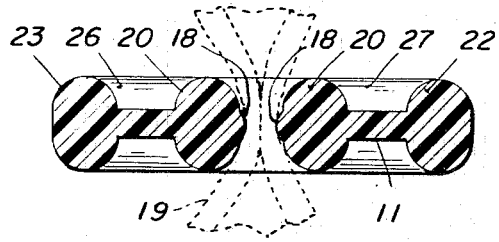
Figure 4:
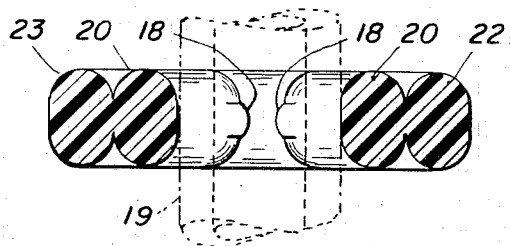

Other objects and advantages of our invention will become apparent from the following description of the preferred embodiment of the invention, in which:

FIGURE 1 is a top plan view of the invention;
FIGURE 2 is a sectional view on the line 2—2 of FIGURE 1;
FIGURE 3 is an enlarged sectional view on the line 3—3 of FIGURE 1; and
FIGURE 4 is an enlarged sectional view on the line 4—4 of FIGURE 1.

As shown in the drawings, the tubing clamp 10 has a generally rectangular body 11. At one end, an integral ring 12 projects longitudinally from body 11 to provide a thumb receiving space having a diameter of from 3/4 inch to 2 inches, and preferably of about 1 inch. The center of ring 12 preferably lies on or adjacent to the longitudinal center line of body 11. If desired, ring 12 may include a flattened section 13 upon which a trademark or corporate name may be embossed.

Body 11 encircles and defines a generally V-shaped slot 16. The end of slot 16 adjacent to ring 12 serves as a shutoff section and has generally parallel sides 17, from which project relatively narrow, parallel jaws 18. The ring 12 is spaced from the end of the slot to provide space wherein the operator's fingers can get between the tube and the ring when the tube is clamped shut. The length of the shutoff section should be at least 10% greater than the flattened width of the flexible tubing 19 to assure complete stoppage of the fluid flow. At the end of slot 16 opposite ring 12, the slot tapers outwardly to a section of maximum diameter which is slightly smaller than the outside diameter of tubing 19. This assures that the clamp can be moved along the length of tubing 19, but will not freely slide along the tubing at an undesirable time.

A slot reinforcing rib 20 having a thickness at least twice that of body 11, is provided completely around the slot 16. Similarly, longitudinal ribs 22, 23, and transverse rib 24 are provided around the periphery of body 11. Transverse ridges 26, 27 are provided between the respective clamping jaws 18 and the adjacent longitudinal peripheral ribs 22 or 23.

Our tubing clamp is preferably molded of a plastic material such as polypropylene or linear polyethylene. Softer grades of polyethylene are unsuitable because they have insufficient stiffness. Polystyrene cannot be used with polyvinyl chloride, commonly used for flexible tubing, because it will be attacked and damaged by plasticizers in the tubing. When molded of polypropylene, body 11 is preferably from 0.03 to 0.05 inch thick, while ribs 20, 22, 23, 24, 26, and 27 and ring 12 are preferably from 0.12 to 0.16 inch thick.

In use, a plasic tubing 19 is passed through the wide end of slot 16. Normally one end of the tubing is connected to a container of fluid and the other end to a patient by means of a catheter or hypodermic needle. To control the flow of fluid through tubing 19, the operator places his thumb in the space defined by ring 12 and places the index finger and the middle finger on the far side of tubing 19, that is, the side of tubing 19 opposite ring 12. Tubing 19 is then pulled by the two fingers into the narrow portion of the slot between the clamping jaws 18. It should be noted that during this procedure the presence of the operator's thumb in ring 12 adds a surprising amount of stability to the clamp 10. In this way, it is insured that the clamp will be held in a position quite close to perpendicular to tubing 19.

Unclamping the tubing is a remarkably easy one-handed operation. With the thumb still in place in ring 12, the operator merely moves the index finger and the middle finger to the side of tubing 19 adjacent ring 12. The two fingers are then used to push tubing 19 out of the narrow portion 17. An alternative, though less desirable, way of unclamping is provided by means of pushing against the concave rib 24 with the thumb while the index and middle fingers are grasped around tubing 19.

An important feature of this invention is the integrally molded thumb ring. The thumb ring allows for either on or off movement of the tubing clamp with one hand, which is most necessary in hospital use when the operator must suspend the fluid container with the other hand. In closing the tubing with the present clamp, the thumb within the thumb ring exerts a pushing action and in opening the tubing the thumb exerts a pulling action. It thus becomes unnecessary to release the clamp and switch the thumb from one end of the slide clamp to the other when switching from the off to the on position, as is required in other slide-type clamps. Since the clamp need not be released, control of the clamp position is not lost.

Although the clamp herein described and illustrated has been designed to be used for an on-off type operation, this type of clamp with the integral thumb ring could easily be converted to a variable flow-type slide valve by changing the shape of the slot to a long continuously tapering slot, thereby providing intermediate flow rates between the on and off positions. Also, the orientation of the thumb ring could be changed so as to have its plane at 90° to the plane of the rectangular body enclosing the slot, though this is a less desirable construction.

The thumb ring of the present invention also provides a convenient place through which to pin the clamp to the bed sheet or the like and which will in turn hold the tubing. In certain types of tubing hook-up, it is important to be able to hold the tubing in a particular position.

While we have shown and described certain specific embodiments of our invention for the purpose of illustration, it is understood that many changes and modifications may be made without departing from the scope and spirit of our invention.

We claim:
1. A flexible tubing clamp comprising: an elongated member having therein a longitudinal slot including a narrow section with inside surfaces adapted to pinch shut a flexible tube and a wide section adapted to surround an outer surface of a flexible tube while leaving a passage through the tube open, a transverse portion of the elongated member closing the end of the narrow section of said slot, said elongated member having disposed therein an opening adjacent to and spaced outwardly from an end of said narrow section of the slot, said opening being of sufficient size to accommodate a human thumb for manipulating said elongated member.

2. A one-hand controlled clamp for flexible tubing through which fluid-flow is to be controlled comprising: a one-piece, homogenous, flat elongated member having an elongated slot, said slot including a narrow said slot including a narrow section including opposed opposed inner surface portions adapted to pinch shut a flexible tube, said narrow section communicating with a wider section adapted to surround the outer surface of a flexible tube while leaving a passage open through the tube.
said elongated member having disposed therein an opening adjacent to and spaced outwardly from an end portion of the narrow section of said slot and defining a portion on said member extending transversely between the elongated slot and the opening for preventing a flexible tube from sliding from said slot into said opening, both said slot and said opening lying along a longitudinal center line of said elongated flat member, the width of said opening being substantially greater than the width of said slot and of a size to accommodate a human thumb to permit pushing and pulling forces to be applied in said opening and directly to said slot along the longitudinal center line of said member for positively manipulating said member relative to a flexible tube in said slot, wherein said clamp can be moved by one hand to selectively open and close the flexible tube and control fluid flow therethrough.

3. A tubing clamp comprising:
(a) a substantially flat rectangular body having an enclosed longitudinal slot extending through its center; said slot having a narrow end capable of closing a section of flexible tubing, an opposite wide end capable of receiving a section of open tubing and being closed at each of said ends by a portion of said body, and
(b) a thumb ring affixed to said rectangular body at the end adjacent the narrow end of said slot, said thumb ring being spaced a sufficient distance from the narrow end of said slot to permit the insertion of the operator's fingers between a tube compressed within the narrow end of said slot and a thumb inserted in said thumb ring whereby the tube can be pushed into the wide end of said slot by means of a one-handed operation.

References Cited
UNITED STATES PATENTS

| | | | |
|---|---|---|---|
| 77,268 | 4/1868 | Finley | 24—137 X |
| 2,092,400 | 9/1937 | Miller | 251—7 |
| 2,653,787 | 9/1953 | Myrick | 251—10 |
| 2,715,905 | 8/1955 | Ogie | 128—214.2 |

FOREIGN PATENTS

| | | |
|---|---|---|
| 1,183,598 | 1959 | France. |

WILLIAM F. O'DEA, *Primary Examiner.*

R. GERARD, *Assistant Examiner.*